(12) United States Patent
Hunter et al.

(10) Patent No.: US 9,189,446 B2
(45) Date of Patent: Nov. 17, 2015

(54) IMMUTABLE SHARABLE ZERO-COPY DATA AND STREAMING

(71) Applicant: Microsoft Corporation, Redmond, WA (US)

(72) Inventors: Jason Todd Hunter, Redmond, WA (US); Jinsong Yu, Bellevue, WA (US); Martin Taillefer, Redmond, WA (US); Gregory Michael Neverov, Seattle, WA (US); Dmitry Kakurin, Redmond, WA (US); Ahmed Hassan Mohamed, Redmond, WA (US); John J. Duffy, Seattle, WA (US); Christopher Wellington Brumme, Mercer Island, WA (US); F. Soner Terek, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 13/734,769

(22) Filed: Jan. 4, 2013

(65) Prior Publication Data

US 2014/0195632 A1 Jul. 10, 2014

(51) Int. Cl.
*G06F 9/54* (2006.01)
*G06F 15/167* (2006.01)
*G06F 12/02* (2006.01)

(52) U.S. Cl.
CPC .............. *G06F 15/167* (2013.01); *G06F 9/544* (2013.01); *G06F 12/0253* (2013.01)

(58) Field of Classification Search
CPC ........................... G06F 12/0253; G06F 15/167
See application file for complete search history.

(56) References Cited

U.S. PATENT DOCUMENTS

| | | | |
|---|---|---|---|
| 8,055,622 B1 * | 11/2011 | Botes et al. | 707/640 |
| 2005/0022172 A1 * | 1/2005 | Howard | 717/136 |
| 2005/0132327 A1 | 6/2005 | Mountain | |
| 2006/0020946 A1 | 1/2006 | Alexander, III et al. | |
| 2009/0138850 A1 * | 5/2009 | Yamaoka | 717/116 |
| 2012/0110559 A1 | 5/2012 | Dolinsky et al. | |
| 2013/0138895 A1 | 5/2013 | McCallum | |
| 2014/0047538 A1 | 2/2014 | Scott et al. | |

OTHER PUBLICATIONS

Goscinski W., et al., "Motor: A Virtual Machine for High Performance Computing", 2006 15th IEEE International Conference on High Performance Distribute D Computing, Jun. 2006, pp. 171-182.

(Continued)

*Primary Examiner* — Lashonda Jacobs
(74) *Attorney, Agent, or Firm* — Henry Gabryjelski; Raghu Chinagudabha; Micky Minhas

(57) ABSTRACT

The environment and use of an immutable buffer. A computing entity acquires data or generates data and populates the data into the buffer, after which the buffer is classified as immutable. The classification protects the data populated within the immutable buffer from changing during the lifetime of the immutable buffer, and also protects the immutable buffer from having its physical address changed during the lifetime of the immutable buffer. As different computing entities consume data from the immutable buffer, they do so through views provided by a view providing entity. The immutable buffer architecture may also be used for streaming data in which each component of the streaming data uses an immutable buffer. Accordingly, different computing entities may view the immutable data differently without having to actually copy the data.

20 Claims, 13 Drawing Sheets

(56) References Cited

OTHER PUBLICATIONS

Pat V. S., et al., "IO-Lite: A Unified I/O Buffering and Caching System", Operating Systems Review, Feb. 1999, ACM USA.
Chi-Chao Chang, et al., "A Software Architecture for ZEro-Copy RPC in Java", Internet Citation, Sep. 1998, pp. 1-16. Retrieved from the Internet at <<http://ecommons.library.cornell.edu/bistream/813/7362/1/98-1708.pdf.
Fruja et al., "Towards Proving Type Safety of C<#>", Computer Languages, Systems & Structures, Pergamon, Amsterdam, NL, vol. 36, No. 1, Apr. 2010, pp. 60-95.
U.S. Appl. No. 13/734,785, filed Jan. 4, 2013, Yu et al.
U.S. Appl. No. 13/734,788, filed Jan. 4, 2013, Taillefer.
U.S. Appl. No. 13/734,793, filed Jan. 4, 2013, Taillefer.
"International Search Report & Written Opinion for PCT Patent Application No. PCT/US2014/010140", Mailed Date: Apr. 7, 2014, Filed Date: Jan. 3, 2014, 9 Pages.
"International Search Report & Written Opinion for PCT Patent Application No. PCT/US2014/010137", Mailed Date: Apr. 9, 2014, Filed Date: Jan. 3, 2014, 10 pages.
"International Search Report & Written Opinion for PCT Patent Application No. PCT/US2014/010132", Mailed Date: Jun. 6, 2014, Filed Date: Jan. 3, 2014, 8 Pages.
Ward, et. al., "Set-Associative Dynamic Random Access Memory", In Proceedings of the International Conference on Computer Design : VLSI in Computers and Processors, Oct. 3, 1988, pp. 478-483.
Liu, et. al., "Design and Research of SoC Communication in CNC System Based on Heterogeneous Processor", In IEEE 12th International Conference on Computer and Information Technology, Oct. 27, 2012, pp. 994-998.
"Druschel, Peter, ""I0-Lite Design"", Published on: Jan. 5, 1999, Available at:https://www.usenix.org/legacy/publications/library/proceedings/osdi99/pai/pai_html/node4.html".
Nagarakatte et al., "SoftBound: Highly Compatible and Complete Spatial Memory Safety for C", ACM 978-1-60558-392-1/09/06, Jun. 15-20, 2009, pp. 245-258.
Notice of Allowance dated Oct. 9, 2014 cited in U.S. Appl. No. 13/734,788.
Office Action dated Oct. 16, 2014 cited in U.S. Appl. No. 13/734,793.
Office Action dated Jan. 20, 2015 cited in U.S. Appl. No. 13/734,785.
Notice of Allowance dated Mar. 12, 2015 cited in U.S. Appl. No. 13/734,793.
Bevan, et al., "An Efficient Reference Counting Solution to the Distributed Garbage Collection Problem", Parallel Computing, Elsevier Publishers, vol. 9, Issue 2, Jan. 1, 1989, pp. 179-192.
Kawai, Eiji, "VMMF: Volatile Memory Management Framework", In IEEE International Systems Conference, Mar. 19, 2012, pp. 1-7.
Written Opinion Received for PCT Application No. PCT/US2014/010132, Mailed Date: Jul. 27, 2015, 7 pages.

\* cited by examiner

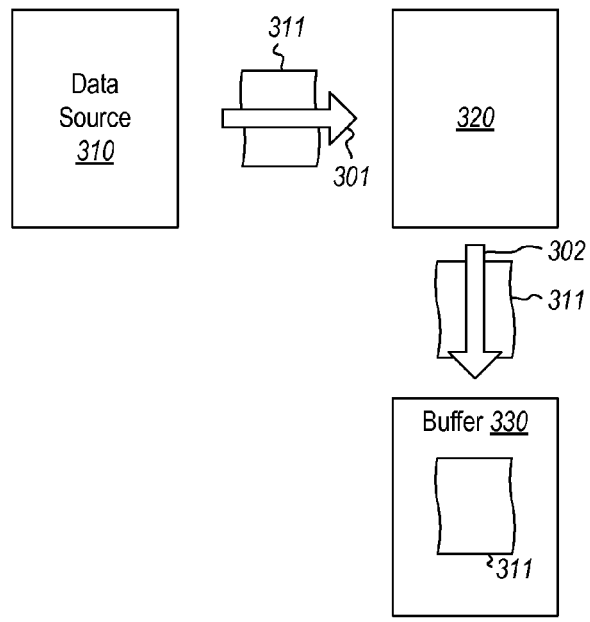
*Figure 3A*
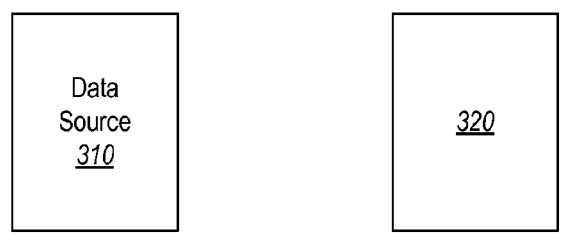
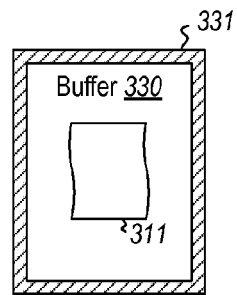
*Figure 3B*

IMMUTABLE SHARABLE ZERO-COPY DATA AND STREAMING

BACKGROUND

Computer operating system performance is often characterized by the maximum rate of input/output (I/O) operations (also called "I/O performance") that the operating system can sustain over a given time interval. As a result, operating systems employ a variety of well-known mechanisms to boost I/O performance.

Operating systems are traditionally written using unmanaged languages (such as assembly language, C, C++) which provides the system programmer with very fine control of how memory is manipulated. The use of unchecked pointers may be used to minimize the operating system's overhead and allow increased throughput or reduced latency. The downside to the use of these unchecked pointers is that they are difficult to create and reason about, leading to unreliable software and to security vulnerabilities.

Writing software in a managed programming language provides substantial correctness benefits and development time efficiencies. These managed languages prevent programmers from creating many kinds of software defects, which leads to improved software quality and reduced development time. Operating system correctness is a critical ingredient for delivering a reliable and secure compute experience. Therefore, using managed languages to create operating systems is a compelling proposition as operating system reliability can improve and development costs can be reduced.

To achieve these benefits, managed programming languages insert an abstraction layer between the source code drafted by the programmer and the raw machine resources of a physical computer system. This abstraction layer generally serves to constrain what programmers are allowed to write, and in so doing eliminate whole categories of potential defects. Unfortunately, this abstraction layer introduces overhead which can hurt the performance of the software being created. As a result, a common assumption is that managed languages trade correctness defects for performance defects. Hence, software written in managed languages is often considered inherently slower than software written in unmanaged languages.

The particular problem that affects managed code operating systems is the inherent need to copy data between layers as the data travels through the system. This is induced by the fact that distinct components of the system exist in different isolation contexts and there is no clear mechanism to break out of these isolation contexts.

SUMMARY

In accordance with at least one embodiment described herein, the environment and use of an immutable buffer is described. A computing entity acquires data or generates data, such as perhaps bulk data, and populates the data into the buffer, after which the buffer is classified as immutable. The classification protects the data populated within the immutable buffer from changing during the lifetime of the immutable buffer, and also protects the immutable buffer from having its physical address changed during the lifetime of the immutable buffer.

As different computing entities consume data from the immutable buffer, they do so through views provided by a view providing entity. Accordingly, different computing entities may view the immutable data differently without having to actually copy the data. For instance, when processing a network packet, instead of passing different portions of the packet by copying from one buffer to another, fine-grained view definitions of the packet may instead be passed, without actually copying the packet itself.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 3A illustrates an environment in which a process of populating a buffer occurs;

FIG. 3B illustrates the environment in which the populated buffer is made immutable;

DETAILED DESCRIPTION

Figure 1:
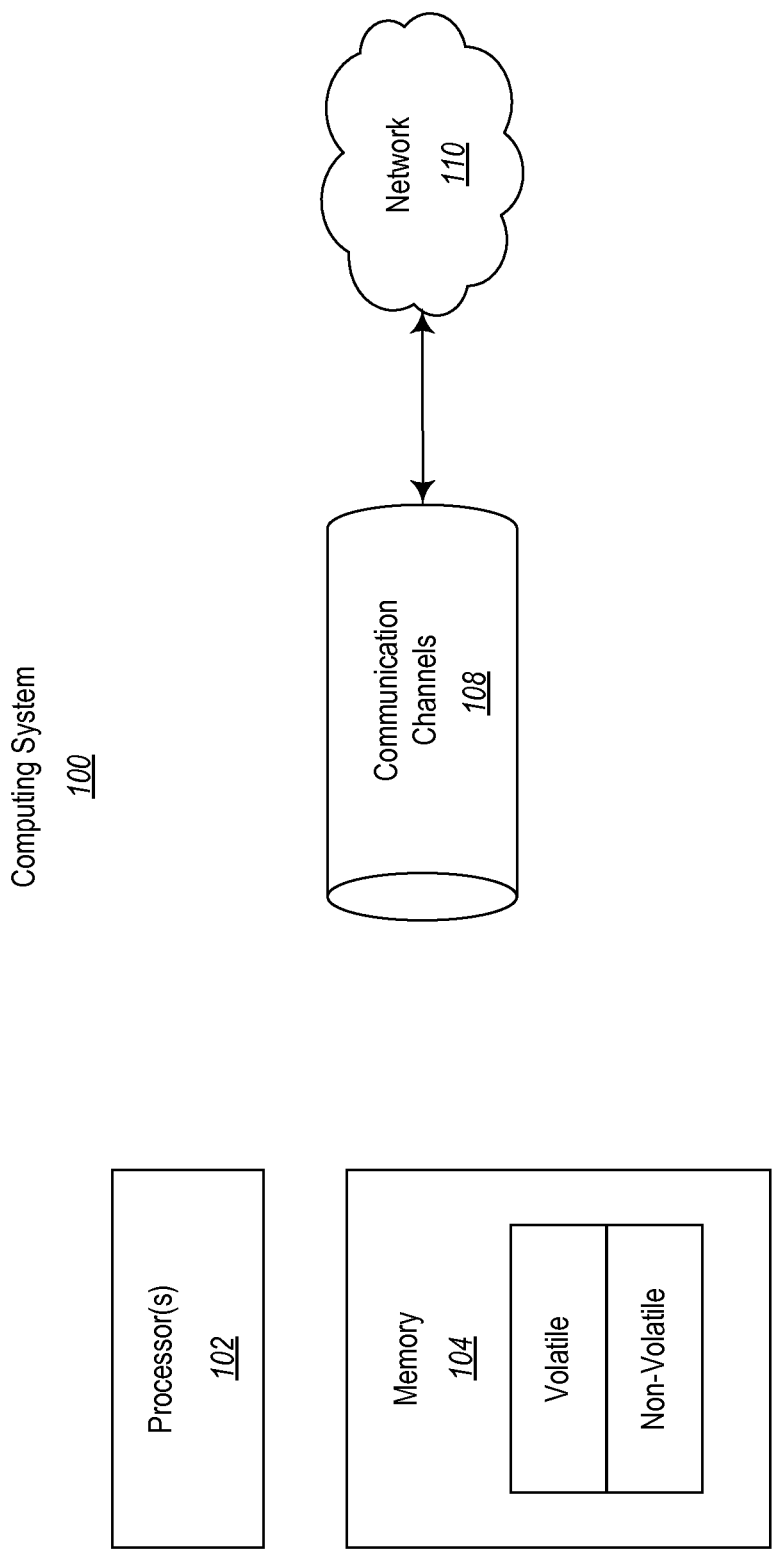
FIG. 1 abstractly illustrates a computing system in which some embodiments described herein may be employed.

In accordance with embodiments described herein, mechanisms are described that promote zero-copy input/output (I/O) semantics in managed operating systems. Some of such mechanisms may be used in unmanaged code operating systems as well as in managed code operating systems. The mechanisms are not mutually exclusive as one, some, or even all of the mechanisms may be combined to even further promote zero-copy I/O semantics.

"Zero-copy" refers to an architecture designed to enable data to enter the system by being written to memory and propagated through many layers of abstractions without the need to copy the data. A zero-copy architecture does not guarantee that no data copying occurs. Rather, it merely puts in place mechanism to ensure that most I/O operations can be done without copying. In this description and in the claims, "memory" is defined as any random access memory, which is typically volatile memory, but may also include non-volatile portions, or perhaps may be entirely non-volatile. In this description and in the claims, "memory" is defined as the primary storage medium of a computing system, compromised of individual addressable locations accessible to the microprocessors of the computing system and accessible to hardware devices such as graphics controllers or network interface controllers via DMA (direct memory access) mechanisms First, immutable sharable zero-copy bulk data mechanisms that use an immutable buffer of shared data will be described. Such mechanisms enable the transfer of large buffers of data throughout the computing system without copying. The mechanisms will be further extended to the shared use of data streams within the computing system with full flow-control to enable efficient resource utilization, all while maintaining full zero-copy semantics. While current type safety of managed code systems allow for more immediate implementation of these mechanisms, the use of these mechanisms within unmanaged code systems may be employed as well.

Second, a mechanism for zero-copy caching will be described. Such zero-copy caching may be employed in both unmanaged code systems and managed code systems. Zero-copy caching makes it possible to create a general purpose caching architecture that features zero-copy semantics for data entering the cache as well as data being returned from the cache.

Third, several mechanisms will be described that further enhance the performance of managed code systems, whether or not those systems employ the immutable buffer or shared data. Such managed code mechanisms include uniform memory access and type-safe type casting. Uniform memory access enables managed code to uniformly access both managed memory and unmanaged memory (used for I/O buffers) using a consistent and composable approach. Type-safe type casting enables managed code to perform pointer casting to allow a given region of memory to be viewed as distinct types while maintaining full type safety.

Some introductory discussion of a computing system will be described with respect to FIG. 1. Then, the above-listed mechanisms will be described in the order provided above with respect to FIGS. 2 through 13.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 includes at least one processing unit 102 and computer-readable media 104. The computer-readable media 104 may conceptually be thought of as including physical system memory, which may be volatile, non-volatile, or some combination of the two. The computer-readable media 104 also conceptually includes non-volatile mass storage. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads). Such executable modules may be managed code in the case of being executed in a managed environment in which type safety is enforced, and in which processes are allocated their own distinct memory objects. Such executable modules may also be unmanaged code in the case of executable modules being authored in native code such as C or C++.

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface controller (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Immutable Sharable Zero-Copy Bulk Data

A major challenge for supporting zero-copy has been the I/O interfaces in traditional systems which are defined as copy operations between different layers in a system. A read Application Program Interface (API) accepts an application buffer as input and fills it with data from some data source. Similarly, a write API takes an application buffer and writes its content into some data target. The semantics of the read/write APIs grants the application full freedom to the buffer alignment, allocation space and retention. This simple model has several inherent limitations being that the model is unable to express non-contiguous buffers or to reduce the number of data copy operations.

Many operating systems support memory-mapped files as a mechanism to share pages in the file system buffer cache with applications and avoid the copy operations associated with the read/write interface. Special APIs have been added to the network interface to directly send data from the file system buffer cache using file memory-mappings to speed up network traffic.

The memory-mapped file abstraction lacks support to hide the underlying alignment and sparse layout of buffers and requires applications to handle and manage the virtual mappings and logical data views directly. For example, an application accessing a file at offset 10 needs to apply pointer arithmetic on the mapping base virtual address to derive the correct address. Extending the file while it is mapped requires the application to manage additional views that may not necessarily be contiguous in its address space and cross view accesses needs to be handled by the application.

Avoiding data copies through memory mapped files has other drawbacks. Ensuring semantic consistency between memory-mapped files and read/write operations requires complex coordination between I/O, memory and file systems. Memory-mapped I/O imposes the overhead of synchronous completion since a page-fault miss on a virtual address that maps to a file region stalls the thread until the page is available in physical memory.

Copy-on-write virtual memory techniques have also been used to hide the cost of copy operations. These copy-on-write techniques alias the application and buffer cache pages based on the assumption that it is rare that applications modify input buffers in place. This gives the file system an opportunity to cache the same physical pages without a copy. For some workloads, this optimization can avoid the copy operation at the price of considerable complexity especially when the application and storage stacks are in different protection domains. Other techniques such as virtual memory page-remapping have been useful for network receive paths under certain conditions when application buffers are properly aligned.

Figure 2:
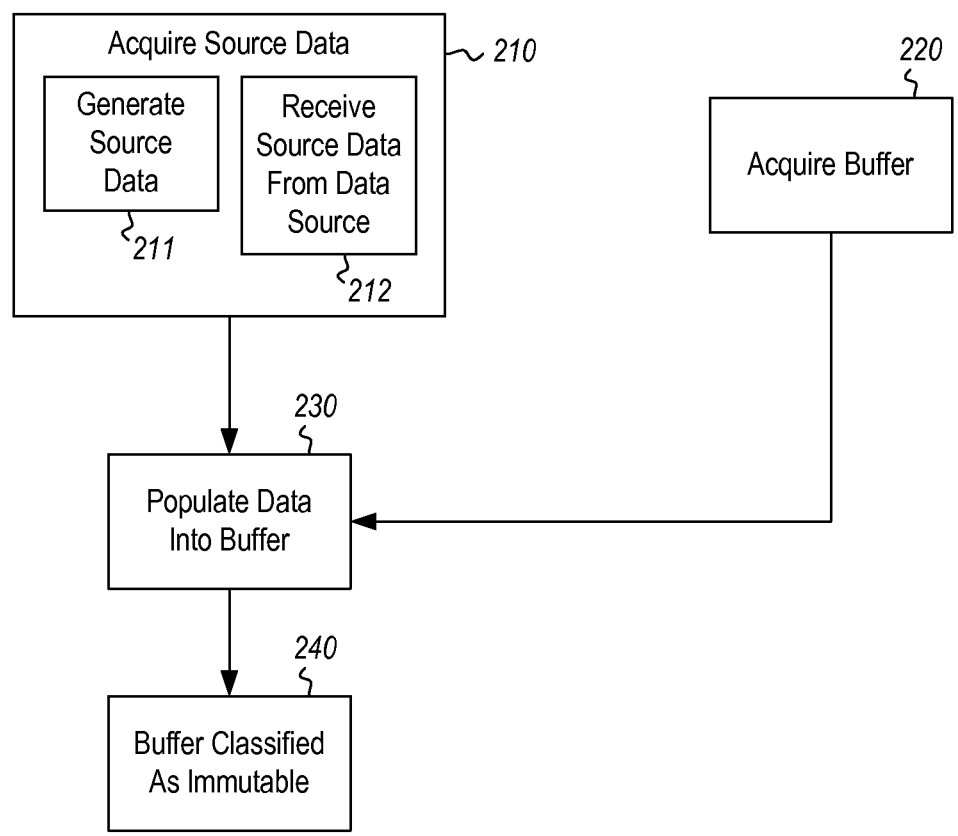
FIG. 2 illustrates a flowchart of a method for providing an immutable buffer.

FIG. 2 illustrates a flowchart of a method 200 for providing an immutable buffer. FIG. 3A illustrates an environment 300A in which a process of populating a buffer occurs. FIG. 3B illustrates the environment 300B in which the populated buffer is made immutable. Accordingly, method 200 of FIG. 2 will now be described with frequent references to FIGS. 3A and 3B. The environments 300A and 300B may occur within the computing system 100 of FIG. 1, although not required. The environments 300A and 300B may be distributed or located on a single computing system.

The source data that is to be used to populate the buffer is first accessed by an acquiring computing entity (act 210). The source data may be any data, but in one embodiment, the source data includes large quantities of bulk data that require significant computing resources in order to generate. In this description and in the claims, a "computing entity" is any component, module, method, function, process, processor, or any combination thereof, that is able to process data in a computing system. Such a computing entity may be distributed or reside on a single computer.

The acquiring computing entity may generate all or some of the source data (act 211). Alternatively or in addition, the acquiring computing entity may acquire all or some of the source data from a data source (act 212). For instance, referring to FIG. 3A, the acquiring computing entity 320 acquires (as represented by arrow 301) source data 311 from a data source 310. The data source might be, for example, a network, or a non-volatile storage device such as a disk.

The acquiring computing entity also acquires a buffer (act 220). This buffer acquisition (220) is shown in parallel with the acquiring of source data (act 210), as the very broadest aspect of the principles described herein do not require either act to occur first. However, in some systems, one may be required before the other and/or they acts may at least partially occur concurrently. Referencing FIG. 3A, the acquiring computing entity 320 acquires the buffer 330 to the extent that the acquiring computing entity may then populate the buffer 330 with data.

Regardless of whether the acquiring computing entity generates the source data, or receives the source data from a data source, or both, the acquiring computing entity populates the buffer with data (act 230). Referring to FIG. 3A, for example, the acquiring computing entity 320 populates (as represented by arrow 302) the data 311 into the buffer 330.

The buffer is then classified as immutable (act 240). FIG. 3B illustrates an environment 300B that is similar to the environment 300A of FIG. 3A, except that data 311 is shown secured within the buffer 330, which is shown as having a cross-hatched boundary 331 abstractly representing that the buffer 330 is now immutable. This classification protects the data (e.g., data 311) populated within the immutable buffer (e.g., buffer 330 in FIG. 3B) from changing during the lifetime of the immutable buffer, and also protects the immutable buffer from having its physical address changed during the lifetime of the immutable buffer. Because of this immutable characteristic, access to the immutable data may be given to an arbitrary number of computing entities without risk of conflict since each of those computing entities may only observe the data.

In a native language environment (such as C or C++), this immutability may be achieved by writing to a Memory Management Unit (MMU) of a processor to restrict the processor from writing to certain ranges of memory. This can be quite expensive, and the restriction on memory accesses are not very granular, being achieved often at the relatively large page level. Further, this can be an expensive operation, and does not avoid circumstances in which copying is performed in order to hide data from different levels at granularities smaller than the page level.

In a managed environment (an environment that includes a managed runtime), software is used to declare memory as immutable, and to enforce the immutability. Furthermore, the lifetime of a memory buffer may be maintained through a usage count, which increments when a new pointer to the memory is given to an entity, and decremented when a pointer to the memory is no longer being used by an entity. When the use count returns to zero, the buffer is unreachable, and can be reclaimed by the memory manager. In one embodiment, the kernel grants authority to different entities to access the memory and maintains a usage count, whereas a managed runtime provides views on the immutable memory, enforces immutability, and provides constraints on the data. More regarding managed environments are described below with respect to FIG. 12.

Figure 4:
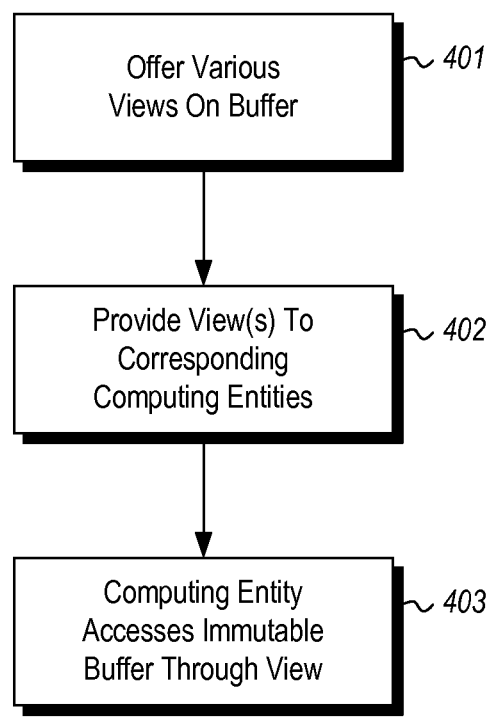
FIG. 4 illustrates a flowchart of a method for using the immutable buffer.

FIG. 4 illustrates a flowchart of a method for using the immutable buffer. First, a view component offers flexible views on the immutable buffer (act 401), and then provides the views as appropriate to different consumers of the immutable buffer (act 402). The computing entity then may access the immutable buffer only through its respective view (act 403). For instance, referencing the environment 500 of FIG. 5, a first computing entity 501 accesses (as represented by arrow 521) the immutable buffer 330 through a first view 511, and a second computing entity 502 accesses (as represented by arrow 522) the immutable buffer 330 through a second view 512. The ellipses 513 show that this may continue for more than just these two computing entities 501 and 502. The views 511 and 512 may be different views, but may also be the same view. Regardless, the view component 520 is capable of providing different views of the underlying immutable buffer 330. In this description, the terms "first" and "second" are used merely to distinguish one item from another, and do not imply any sort of sequence, priority, position, or importance.

Figure 5:
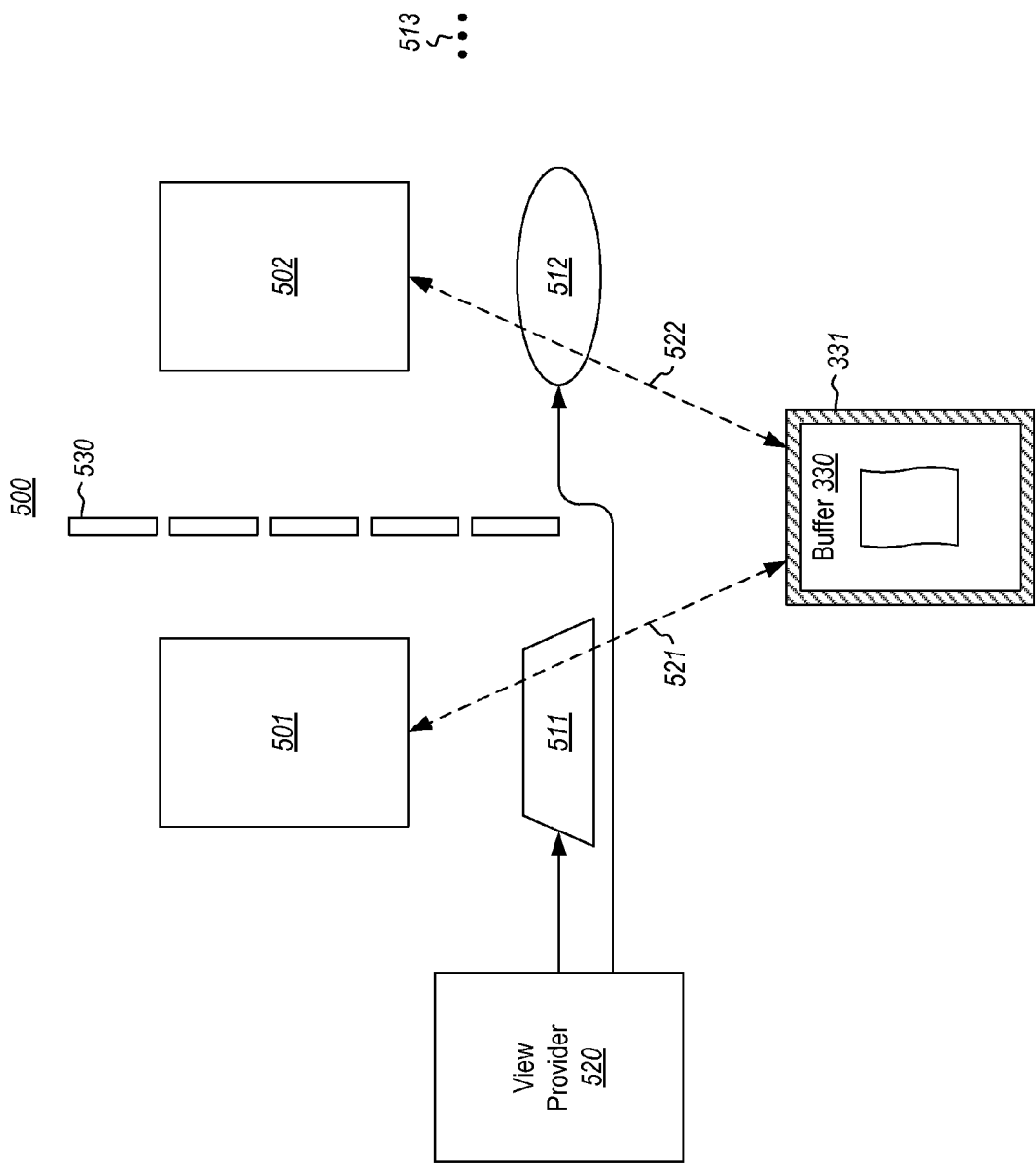
FIG. 5 illustrates an environment in which different computing entities have different views on an immutable buffer.

In some embodiments, the computing entities that consume data from the immutable buffer are on different sides of a protection or process boundary. For instance, FIG. 5 illustrates that the computing entities 501 and 502 that consume data through their respective views 511 and 512 are actually separated by boundary 530. For instance, the computing entities 501 and 502 may be distinct processes in which case the boundary 530 represents the boundary between processes. The boundary 530 may also be a protection boundary in which case one may not provide data directly to the other without copying. For instance, the computing entity 501 might be a kernel component within the operating system, whereas the computing entity 502 might be a user mode component such as an application component.

Typically, data is not shared across process and protection boundaries unless the data is copied. Such copying can take a significant amount of computing resources, especially if the amount of data copied is very large, or if different portions of the data are to be frequently shared across such boundaries. The principles described herein provide a convenient and flexible mechanism for sharing data across process and protection boundaries without copying. This thereby improves the performance of the operating system.

The views provided by the view provider 520 may be fine grained. For instance, suppose that the immutable data to be read from the immutable buffer is network data. The various layers of the protocol stack may each be interested in different portions of that network data. The network level components (such as an Internet Protocol component) may be interested in the network level headers, whereas the application level component may be simply interested in the raw payload. Between these two layers are different components that are interested in different portions of the network data.

The principles described herein may be effectively applied to the processing of this network data without requiring the network data be copied. For instance, the lowest level of the protocol stack may be able to view the entire network packet. That lowest level may process the outermost header of that packet, and return a view definition to the next higher level component in the protocol stack. The view definition defines the entire scope of the network packet except for the outer most packet. This second component provides the view definition to the view provider 520, which provides this view to the second component. Thus, the lowest component sees the entire packet, whereas the next component sees the same packet without the outermost header. This was done without copying data at all. Instead, the data stayed within the immutable buffer. This may be repeated until the highest application layer is provided with a view definition that defines only the payload of the packet.

Figure 6:
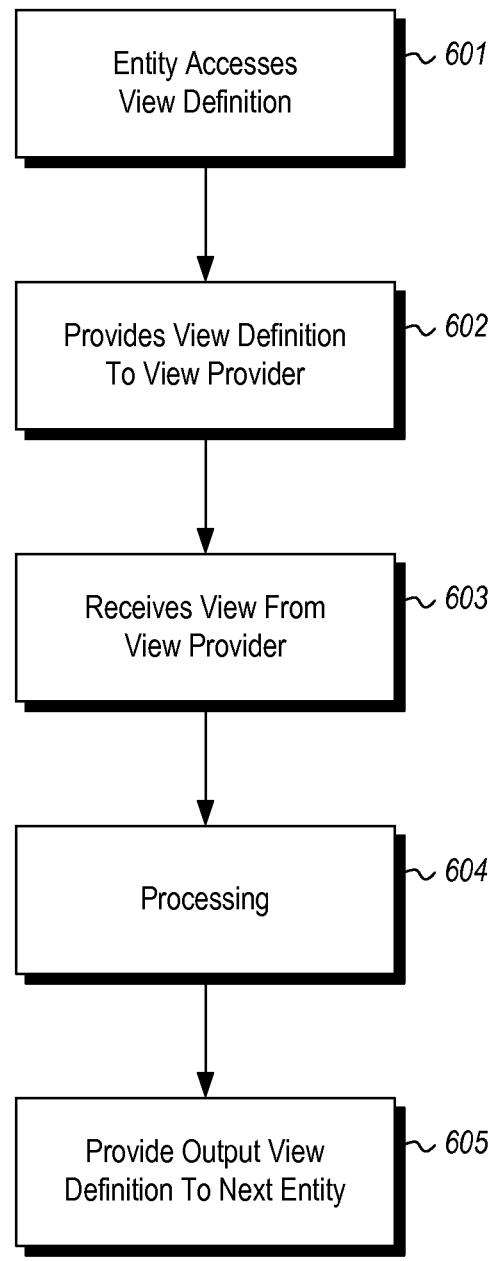
FIG. 6 illustrates a flowchart of a method for communicating the immutable data from one computing entity to the next.

FIG. 6 illustrates a flowchart of a method 600 for communicating the immutable data from one computing entity to the next. A first computing entity accesses a view definition (act 601), and provides that view definition to a view provider (act 602). The view provider then provides the view to the first computing entity (act 603). After the first computing entity performs its logic (act 604), it may then provide another view definition to the next computing entity (act 605) that is to process the data from the immutable buffer. The next computing entity may then repeat this method 600, and thus the process may continue through multiple layers of the system.

While the above describes consuming buffers/streams in a zero-copy manner, the principles described above may also apply to the production of buffers and streams by a data producer. In case of a data producer, there is also flexibility for the application to send its own buffers (allocated separately) or to ask the data producer to provide writable views (Spans) into its own internal buffer. This potentially not only eliminates copying but also improves buffer utilization by eliminating need to send half-filled buffers.

Zero-Copy Data Streaming

Bulk data movement through an operating system is often modeled using a stream architecture. A stream represents a logical conduit between a data source and a data consumer, allowing the data produced by the source to be delivered to its destination. Streams typically implement buffering in order to accommodate throughput incongruities between the producer and consumer.

Figure 7:
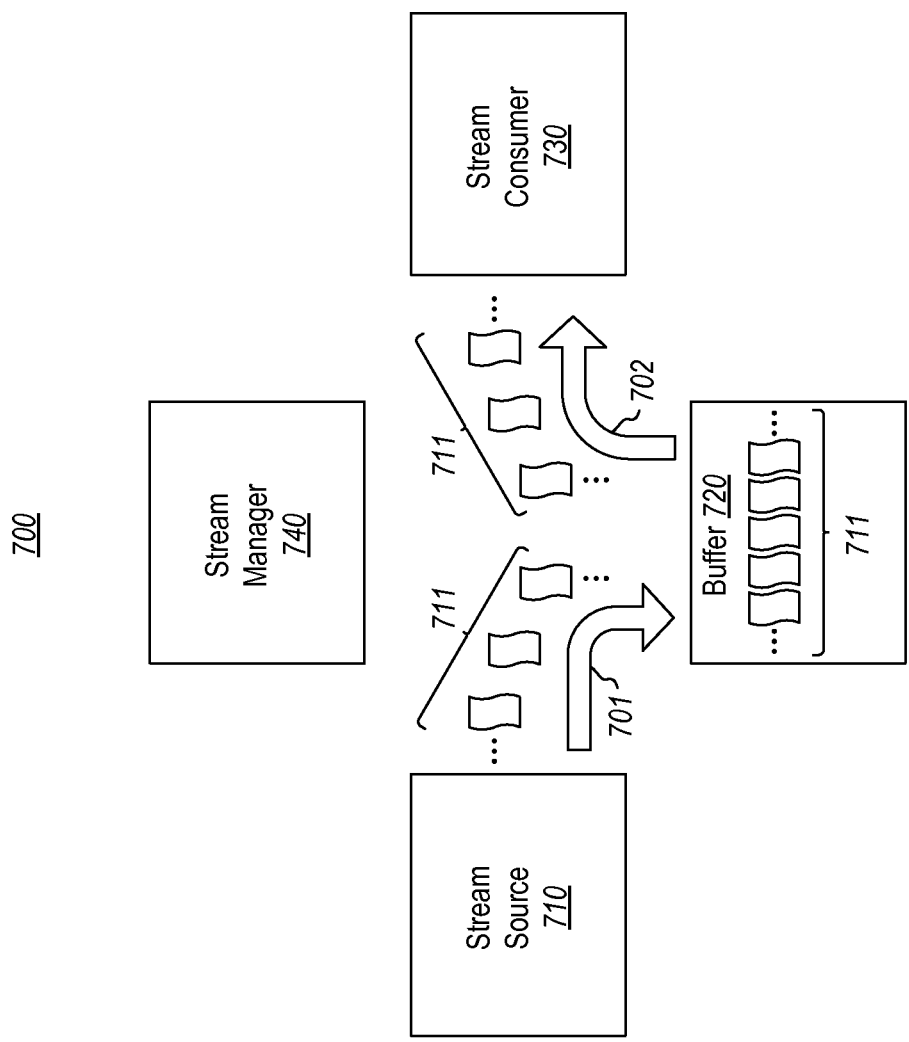
FIG. 7 illustrates a streaming environment in which a stream of data is provided from a stream source into a stream buffer, and then provided from the buffer to a stream consumer.

For instance, FIG. 7 illustrates a streaming environment 700 in which a stream of data 711 is provided (as represented by arrow 701) from a stream source 710 into a stream buffer 720, and then provided (as represented by arrow 702) from the buffer 720 to a stream consumer 730. The environment 700 also includes a stream manager 740 that performs flow control. The stream manager 740 causes the stream portions to be fed to the stream consumer 730 from the buffer 720 (as represented by arrow 702) at a satisfactory rate for the stream consumer 730. Furthermore, the stream manager 730 performs proper read ahead of the stream (as represented by arrow 701) to ensure that the amount of stream portions within the stream buffer 720 are not so few that the stream consumer 730 is at risk of running out of stream portions, and not so many that an unnecessary amount of memory of the stream buffer 720 is occupied. The stream manager 740 also manages the lifetime of the stream portions within the stream buffer 720 such that the memory occupied by the stream portion may be reclaimed once the stream portion is consumed.

Streams often logically cross multiple process and/or protection boundaries. For example, when an application reads data from a file, the data is often read from the physical disk under the control of a protected-mode device driver. The data then passes through a file system layer, and then is finally made available to application code. Often, layer crossing can involve data copying which impacts performance and power consumption.

However, the principles of the zero-copy immutable buffer described above may be used to formulate a stream buffer (such as stream buffer 720) in which the need to copy stream portions across processes or protection boundaries is eliminated.

Specifically, suppose that an immutable buffer (such as that described with respect to FIGS. 2 through 6) is established for each of the multiple stream portions in the stream. Furthermore, suppose that the method of FIG. 2 and the processes of FIGS. 3A and 3B are performed to create an associated immutable buffer containing a single stream portion, each time a stream portion is received.

Such an immutable buffer allows any data, including stream portions, to be passed through different layers and components of the system, allowing each to have their own specific view on the data, without requiring copying of the data, as described with respect to general data in FIGS. 5 and 6. The stream buffer 720 in that case would simply be a collection of immutable buffers, each having a corresponding stream portion contained as data therein. As each stream portion is consumed, the memory of the corresponding immutable buffer is allowed to be reclaimed. Thus, zero-copy data streaming is possible using the principles described herein.

Zero-Copy Caching

Caching is an important aspect of any operating system's I/O subsystem. Latency is reduced and effective throughput is increased by leveraging the fact that data access patterns tend to be clustered and the same data is often retrieved multiple times. Traditional caching is done by having dedicated pools of memory at varying layers of the operating system managed independently each with orthogonal retention and replacement policies. Accessing data from a cache often involves copying data out of cache buffers into application buffers.

The principles described above with respect to FIGS. 2 through 6 allow sharing of immutable buffers between processes and across protection boundaries, through which function calls cannot be placed, but rather a much more expensive inter-process communication or a cross protection boundary communication must be used for communication across boundaries.

These principles may be used to implement a cache. As data flows from Direct Memory Access (DMA) operations, the data is introduced into the system as immutable buffers (such as the immutable buffer 330 of FIGS. 3A, 3B and 5). The immutable buffers can be circulated around the system to communicate the new data and can at the same time be snapshot into a cache for later reuse. When a later request for the data emerges, the same immutable buffer can be retrieved from cache and reused—all without ever copying or indeed even accessing the underlying data. This leads to substantial efficiency gains.

When a computing entity holds a cache that is based on the underlying data in the immutable buffer, the computing entity has a "strong" reference to the underlying data in the immutable buffer, and may use that strong reference to access the data of the immutable buffer. The use of the term "strong" to modify reference is merely used to distinguish the reference from what will be termed "soft" and "weak" references below. Likewise, the use of the term "weak" and "soft" to modify reference is merely used to distinguish the references from each other and from a strong reference.

So long as any entity has a strong reference to an immutable buffer within the cache, the immutable buffer and its data is guaranteed to continue to exist for at least the duration of the strong reference for each entity that has the strong reference. A "soft" reference to an immutable buffer cannot be used to access data from the immutable buffer without first converting the soft reference to a strong reference. A strong reference may be converted to a soft reference once the data access is completed.

The soft reference may be used as a form of memory management hint. If there are only soft references to a given immutable buffer by any computing entity and the system is running low on memory, the system may choose to reclaim the memory backing that immutable buffer. If this occurs, then the next attempt to convert the soft reference into a strong reference will fail. The contents of the buffer are lost and the computing entity would have to re-generate the contents of another immutable buffer from the data source.

This soft reference is a valuable way to use as much system memory as possible for caches without requiring high accuracy for tuning the sizes of the caches in the system. For example, a cache can choose to hold a large portion of its data as soft rather than strong references. The memory usage of another process can then spike large enough to drive the system to a low memory state. The system can then react quickly and free up memory from these soft references without needing to make any choices about how much memory to give which process.

A computing entity may also hold a "weak" reference to a given immutable buffer. As with a soft reference, a weak reference must be converted to a "strong" reference to allow access to the data within the immutable buffer. A strong reference may also be converted into a weak reference. The weak reference provides a second form of memory management for these buffers. It is used to retain potential access to an immutable buffer without causing the computing entity that holds the weak reference to be charged with the memory used by that buffer. If there are only weak references to a given immutable buffer by any process, then the underlying buffer may be immediately released.

Weak references to immutable buffers may be used to mitigate the cost of inter process and cross protection boundary communications that would be required to retrieve the strong reference to the immutable buffer from another process that has a strong reference to the immutable buffer. That is, a cache of weak references could be created in one computing entity (e.g., one process) to mitigate the costs of retrieving those buffers from another computing entity (e.g., another process), even if they were already cached by that other computing entity.

Figure 8:
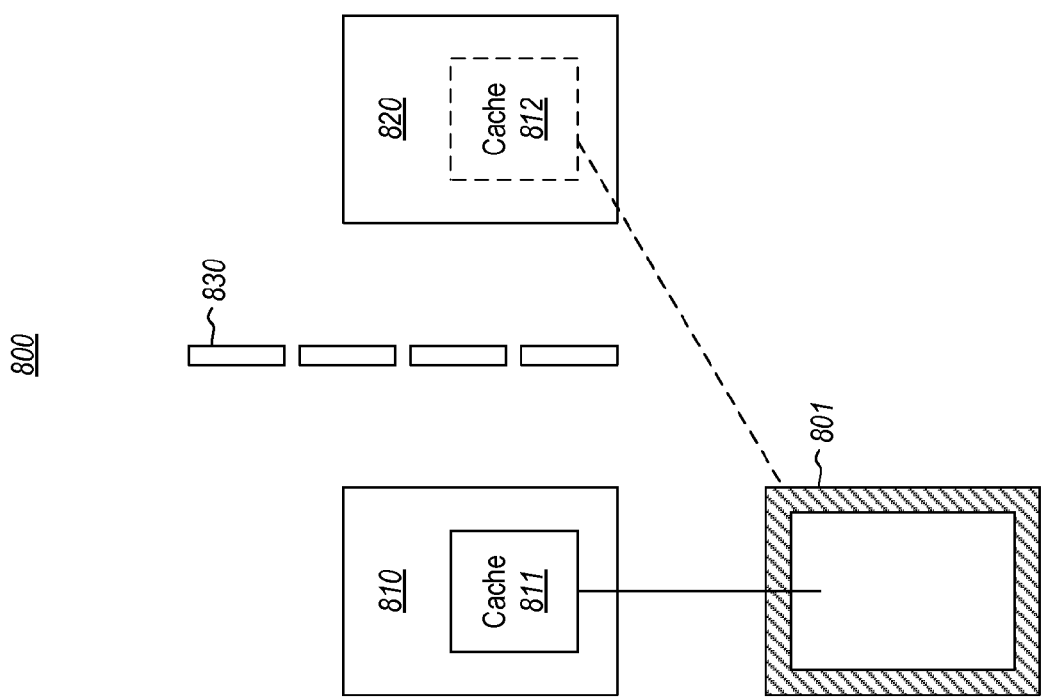
FIG. 8 illustrates an environment in which a second computing entity acquires a cache through the cache of a first computing entity.
Figure 9:
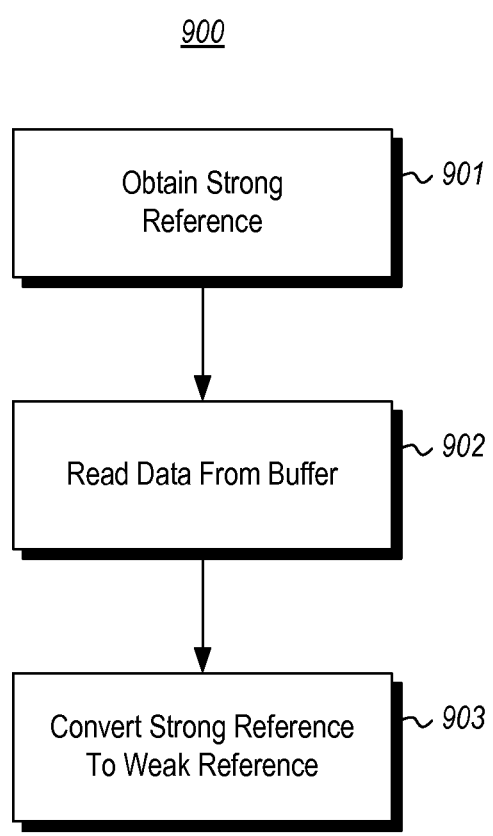
FIG. 9 illustrates a flowchart of a method for a second computing entity to first read from a cache supported by a first computing entity.
Figure 10:
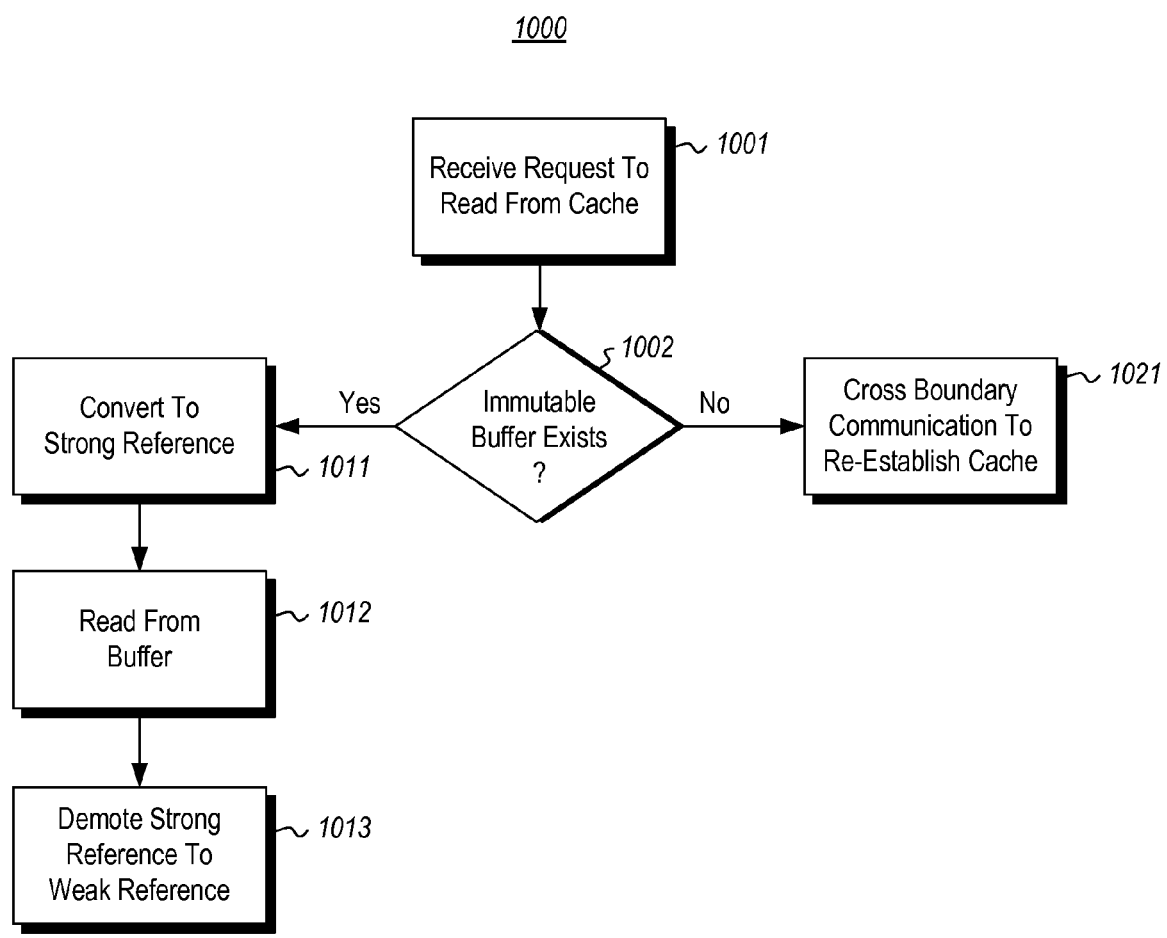
FIG. 10 illustrates a flowchart of a method for the second computing entity to subsequently read from the cache supported by the first computing entity.

FIG. 9 illustrates a flowchart of a method 900 for a second computing entity to first read from a cache supported by a first computing entity. FIG. 10 illustrates a flowchart of a method 1000 for the second computing entity to subsequently read from the cache supported by the first computing entity. Together, the methods 900 and 1000 allow the second computing entity to build a local cache based on the cache held by the first computing entity. The methods 900 and 1000 may be performed in the context of the environment 800 of FIG. 8, and thus will be described with frequent reference to FIG. 8.

Referring first to the environment 800 of FIG. 8, a first computing entity 810 has a cache 811 of data supported by the immutable buffer 801. A second computing entity 820 is to acquire data from immutable buffer also. The second computing entity 820 is also to maintain a cache 812 of data derived from the immutable buffer 801. However, the cache 812 is a weak cache in the sense that it may not wait for a release command from the second computing entity before ceasing to exist. Thus, the second computing entity 820 does not have control over when its cache 812 is released.

A boundary 830 (an inter processor or protection boundary) is between the first computing entity 810 and the second computing entity 820). In one example, implementation, suppose the first computing entity is a file system, and the second computing entity is a web server that serves up and/or processes files provided by the file system.

When the first computing entity acquires the cache (e.g., a file cache in the case of a file system), the first computing entity gains faster and more local access to the data (hence the term "cache"), but also acquires a strong reference to the immutable buffer that supports the cache. The strong reference provides the guarantee that the immutable buffer (and its data) will continue to exist for at least as long as the first computing system continues to hold the strong reference (and potentially longer if other entities also hold strong references to the immutable buffer). In this state, we enter the description of FIG. 9, which illustrates a method 900 for the second computing entity (e.g., second computing entity 820) to initially read from the cache (e.g., cache 811) supported by the first computing entity (e.g., first computing entity 810).

The second computing entity communicates with the first computing entity to obtain a strong reference to the immutable data (act 901). This is an inter process or cross protection boundary communication, and thus is an expensive communication. However, it may well be the only cross boundary communication required for so long as the immutable buffer that supports the cache continues to exist. For instance, suppose that the web server received a first request for a file contained within the cache. This initial request may cause the web server to perform this initial communication and obtain a strong reference to the immutable buffer from the file system. Using this strong reference, the second computing entity may read data from the immutable buffer (act 902). Upon or after reading the data from the cache, the second computing entity demotes the strong reference to the immutable buffer that to a weak reference to the immutable buffer (act 903).

FIG. 10 illustrates a flowchart of a method 1000 for the second computing entity to subsequently read from the cache supported by the first computing entity if the cache of the second computing entity does not have the data. Upon receiving a request to read from the cache while the weak reference to the cache still exists (act 1001), the second computing entity determines whether the immutable buffer still exists (decision block 1002). If the immutable buffer still exists ("Yes" in decision block 1002), the second computing entity converts its weak reference to a strong reference to the immutable buffer (act 1011), reads from the buffer (act 1012) (and locally caches that data in the local cache 812), and thereafter converts the strong reference back to a weak reference (act 1013). This is done without performing an inter-process or cross protection boundary communication with the first computing entity. Rather, the second computing entity simply acquires a view on the immutable buffer, and reads from the immutable buffer.

If the immutable buffer does not still exist ("No" in decision block 1002). An inter-process or cross protection boundary communication is performed with the first computing entity to thereby cause the first computing entity to re-acquire the data and recreate a new immutable buffer (act 1021). Then, returning to the method 900, the second computing entity may then gain a strong reference to a new immutable buffer (act 901) and read from the buffer (act 902).

Thus, the second computing entity may be viewed as having a weak cache (one that may have to be rebuilt before the second computing entity is done using the weak cache) that is derived from the strong cache of the first computing entity (one that remains in place at the control of the first computing entity). Building this second "weak" cache on top of another strong cache raises some problems with the replacement (or eviction) policy on the backing cache. Eviction refers to a mechanism in which less used data (i.e., "cold" data) is removed (or evicted) from the cache to make room for more frequently used data (i.e., "hot" data). Eviction is based on statistics regarding frequency in which certain items of data are accessed. The weak cache 812 and the strong cache 811 have distinct statistics regarding frequency of access of cache portions since they see different requests for data.

Specifically, the weak cache 812 will be used to serve requests by the second computing entity 820 first before falling back to the backing cache 811. This weak cache will thus absorb all but the initial references to hot data, hiding their usefulness to the backing cache 811. Thus, when the backing cache 811 receives requests for new items, without addressing this, the backing cache might cause the data that is "hot" according to the statistics of the weak cache 812, to replace items that are still being retained by the weak cache 812. This replacement may remove the last persistent strong/soft reference to the underlying buffer, releasing the buffer corresponding to the weak reference in the weak cache. The next request for that item against the weak cache will then fail.

In accordance with embodiments described herein, this problem is addressed by communicating the usefulness of the hot data (as seen by the weak cache 812) to the backing cache 811. The system may provide this mechanism as a side effect when the second computing entity converts a weak reference for the data into a strong reference for the data. The system counts the number of times this occurs per underlying buffer and exposes this count as a metadata property on the buffer itself. The backing cache can then query this value and determine the number of references that have occurred between any two points in time. This information can be used by the backing cache's replacement algorithm to keep that item alive in both caches.

Figure 11:
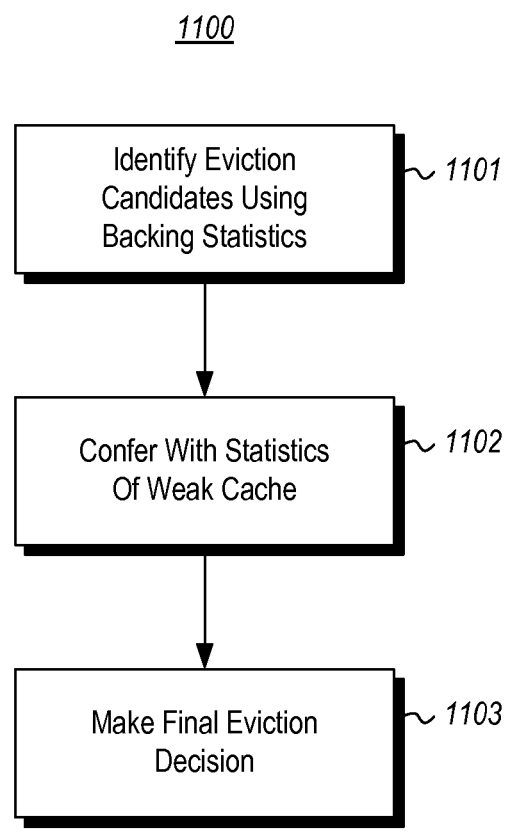
FIG. 11 illustrates a flowchart of a method for the first computing entity (or the backing cache) to perform eviction.

FIG. 11 illustrates a flowchart of a method 1100 for the first computing entity (or the backing cache) to perform eviction. First, the backing cache uses its own statistics in order to identify candidates for eviction (act 1101). The first backing cache then confers with the second statistics of the weak cache for those identified candidates (act 1102). The eviction decision regarding the identified candidates is then committed (act 1103) after having conferred with the second statistic such that if the second statistic indicates more frequent access of the identified candidate, the identified candidate may be kept within the cache for the time being.

These first three concepts (namely, Immutable Sharable Zero-Copy Bulk Data, Zero-Copy Data Streaming, and Zero-Copy Caching) may be applied in unmanaged code systems as well as managed code system. However, since the views provided by managed systems may be create more quickly and made much more fine-grained than those of unmanaged systems, the principles may be most effectively used with managed systems.

Figure 12:
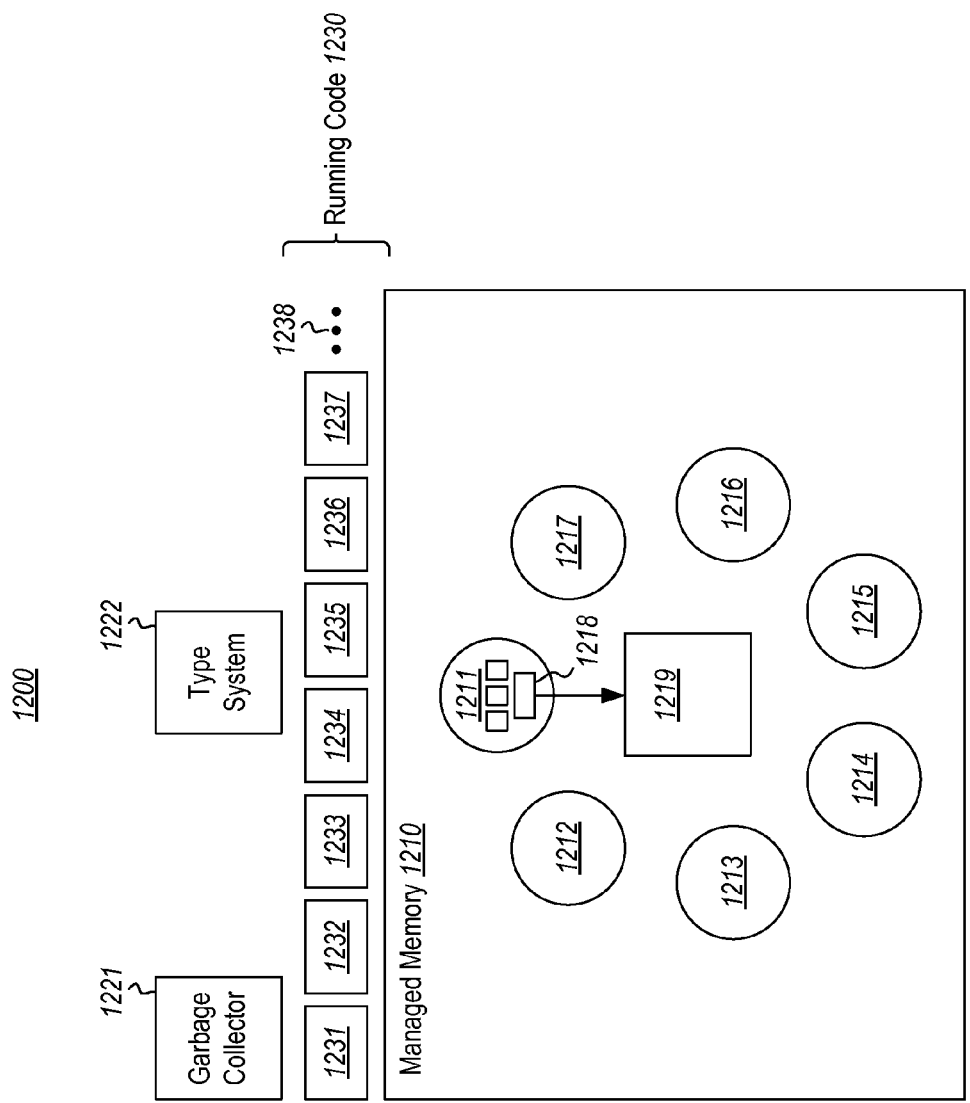
FIG. 12 illustrates an example managed code system.

FIG. 12 illustrates an example managed code system 1200. The managed system 1200 includes managed memory 1201. The managed system 1200 has multiple managed code components 1230, each having exclusive access to entity-specific memory. For instance, the running managed code components 1230 are illustrated as including seven components 1231 through 1237, though the ellipses 1238 represent great flexibility in this number. For instance, the components 1231 through 1237 may be processes.

Each of the seven running components 1231 through 1237 has a corresponding entity-specific memory 1211 through 1217. A managed component may not access the entity-specific memory of another entity-specific memory. Thus, there is isolation protection between entity-specific memory such that only the corresponding managed component may access that entity-specific memory. For instance, component 1231 accesses entity-specific memory portion 1211, but not entity-specific memory portions 1212 through 1217; component 1232 accesses entity-specific memory portion 1212, but not entity-specific memory portion 1211 or entity-specific memory portions 1213 through 1217, and so forth.

The managed code memory 1210 also includes shared memory 1219. This shared memory 1219 is an example of the immutable buffer 330 of FIGS. 3A, 3B and 5. That said, the above described principles do not rely on a managed code system at all. However, the final two concepts described herein are limited to managed environments. A few further elements of FIG. 12 will be described with respect to the description of these final two concepts (namely, Uniform Memory Access and Type-Safe Type Casting.

Uniform Memory Access

Memory in a managed language environment is a potentially very dynamic thing. Objects are allocated out of a heap and are managed by a garbage collector. Referencing FIG. 12, the managed system 1200 includes a garbage collector 1221. Based on heuristics, the garbage collector regularly performs maintenance of the heap by compacting objects together in order to reclaim previously used space. Compacting objects together implies that the memory address of an object is essentially unstable, subject to change by the garbage collector. The garbage collector depends on particular code generation patterns and on support from the operating system to be able to move objects in a way that is transparent to application-level code.

An operating system's I/O subsystem is responsible for shuffling large quantities of data through system memory. When reading, data is typically acquired from an external device and put into memory through a DMA operation managed by the device itself with minimal interaction with the processor. Similarly, when writing data out, DMA memory operations can automatically read the content of memory.

DMA operations cannot contend with the content of memory being relocated during the operation. Doing so would require fine-grained coordination between the processor and the devices which would impact performance and power efficiency dramatically. As a result of this constraint, there are two broad options to support DMA in a managed operating system:

Special pinning operations are used against regions of memory to instruct the garbage collector not to relocate specified objects. This allows DMA operations to see a consistent snapshot of affected memory while they execute.

DMA operations occur in special memory regions which are not subject to garbage collection.

The first approach can substantially hamper the efficiency of the garbage collector as dealing with pinned regions of memory complicates the compaction process and reduces its efficiency. The second approach avoids that problem, but can easily lead to excessive memory copying as specialized logic is needed to transfer data between normal memory regions and the special DMA-friendly memory regions.

A unified memory access architecture delivers a systematic way to reference memory, whether it is normal managed memory or whether it is special DMA-friendly memory regions. This makes it possible for programmers to manipulate data in DMA-friendly memory regions directly in a completely safe way, avoiding both the need to pin objects and to copy between normal memory and DMA-friendly memory.

In a managed language environment, bulk data is typically held in arrays. The managed language environment (e.g., managed system 1200) directly understands arrays, allowing access to individual array elements and ensuring programmers cannot exceed the bounds of the array. Being managed by the language environment, arrays are constrained to be located in the managed heap.

In the managed system 1200 of FIG. 12, the immutable buffer 1219 is located outside of the managed heap and so under normal circumstances would not be directly accessible from managed programs. Reading and writing from I/O memory would normally be done using a classic I/O package with explicit read and write operations which induce implicit copying between normal memory in the managed heap and I/O memory.

The managed system includes an abstraction (referred to herein as a "span") which provides a mechanism to directly access the immutable buffer 1219 from a managed code component. Referencing FIG. 12, the managed memory portion 1211 includes a variety of objects, including the abstractly represented span abstraction 1240. Spans can safely be created to provide direct access to any region of an I/O buffer in a manner very similar to how arrays work. Further, spans can be constructed to reference managed memory. Software abstractions built on top of spans can therefore be agnostic to the location of the span's underlying memory. This provides the ultimate composition story, allowing abstractions to be designed in a natural way to operate on managed memory (e.g., memory portions 1211 through 1218) or the immutable buffer 1219.

Spans are created by interacting with the underlying storage for the span. For example, the immutable buffer 1219 may provide method calls to return spans that reference the immutable buffers controlled by the span directly. Similarly, arrays provide methods that return spans that point to them or portions of them. Once a span has been materialized, it can be passed around and used largely like arrays are used in normal managed languages.

A particular subtlety with spans relates to the lifetime management of the underlying storage. One of the primary benefits of a managed programming environment is that the garbage collector takes on the responsibility to detect when objects are no longer referenced and their storage can be recycled. This is what happens when arrays are no longer useful for example.

When the memory underlying a span is outside of the normal garbage collected heap, then the lifetime of that memory should be managed carefully such that spans created that reference the memory do not outlive the memory buffer itself. This can be arranged in a number of ways, such as by using reference counters on the underlying memory or bounding the lifetime of spans themselves.

In one embodiment, a span object holds a specially-annotated pointer to the region of memory it represents. The garbage collector understands these special pointers and treats them specially. During a garbage collection operation, if the garbage collector encounters a special pointer it considers the address that the pointer holds. If the garbage collector detects that the pointer points outside of the managed heap, the garbage collector ignores the pointer completely from that point forward. If instead, the pointer is found to point within the managed heap, the garbage collector treats the pointer as a reference to a managed object and hence automatically adjusts the pointer's value in the eventuality that the underlying object is relocated.

Spans can be created to represent sub-regions of other spans. This makes spans a very convenient way to carve out a chunk from a bigger memory region in a safe and cheap way without making copies. The resulting span looks like any other span even though it is aliased to a subset of the memory of another span.

Type-Safe Type Casting.

A primary role of managed programming languages is to enforce type safety which prevents a program from taking an arbitrary address in memory and manipulating it as an object. For instance, the managed system 1200 of FIG. 12 includes a type system 1222 that ensures type safety. All objects are acquired explicitly and the address of each object is controlled firmly by the garbage collector (e.g., garbage collector 1221). In such a system, memory not under the direct control of the garbage collector cannot be used directly by application code. Instead, memory ends up needing to be copied from the special memory back into memory controlled by the garbage collector before it can be used, which is inefficient.

As data flows in and out of a system through DMA operations, the data manipulated by the DMA devices typically has some inherent shape. For example, when writing data out through DMA, some data structure in the garbage collected heap typically holds the data that needs to be written out. A "serialization" step is then used to transcribe the data in those structures into the shape needed for the DMA operation. This serialization step is tedious, error prone, and inefficient. Serialization and deserialization are usually part and parcel of managed programming languages.

By leveraging the span abstraction, a general-purpose model enables programmers to directly interact with DMA memory regions using object-oriented semantics. Special type casting support makes it possible for the programmer to view DMA memory regions as objects and hence directly read and write the memory in a natural way, maximizing efficiency, improving correctness, and simplifying the programmer's task. The model extends beyond merely DMA memory and supports extended type casting semantics for normal garbage collected memory as well.

To maintain type safety, it is not possible nor desirable to allow type casting between arbitrary types. Instead, specific rules exist that constrain the set of allowed types that can be involved in this extended type casting. The rules are fairly broad however and end up working perfectly for the kind of data usually involved in DMA operations.

In a managed programming language, whenever memory is allocated it is assigned a given type. The type determines the significance of different portion of the block of memory and the operations that can be performed against the block of memory. The type cannot be changed for the block of memory until the memory becomes inactive and is recycled through a garbage collection process. At all times, the language environment is responsible for allocating, typing, and recycling blocks of memory.

Type casting is the ability to treat some memory as a type other than the one it is known to be by the managed environment. Type casting is common in native programming language, but managed languages generally do not offer type casting. Instead, managed environments provide type conversion mechanisms that make it possible to copy one type of value into another type. For example, it is possible to convert an integer value to a floating-point value. This is always done through copying however—the original memory location remains unchanged.

In accordance with the principles described herein, type casting is introduced as a general-purpose facility in managed languages. Restrictions are applied to ensure type safety is preserved, as explained later.

In a managed operating system, memory used for I/O operations must either be pinned objects or be regions of memory dedicated to I/O. As mentioned previously, pinning objects in memory to prevent them from moving is expensive and leads to many problems in a garbage collected environment. The principles described herein use dedicated I/O memory in the guise of immutable buffers (such as the immutable buffer 330 of FIGS. 3A, 3B and 5).

I/O memory is outside of the reach of the managed memory subsystem. The managed environment does not control the type of this memory and hence it is not possible to directly access this kind of memory from a managed program. Instead, special connecting (i.e., glue) code would normally be used in order to allow this memory to be read or written using explicit calls. Accessing any kind of structured data within these I/O buffers involves tremendously inefficient code, or involves copying data to and from the I/O memory into the normal managed memory, which is also inefficient.

Consider an immutable buffer acquired from a network device. In this buffer, there is a TCP header holding networking protocol information. There are basically two ways that the data in the TCP header can be used in a managed programming language. The table below shows both approaches and the steps involved in each.

| Classic Managed Environment | Type Casting |
|---|---|
| Determine the offset of the TCP header in the buffer. | Determine the offset of the TCP header in the buffer. |

| Classic Managed Environment | Type Casting |
|---|---|
| For each field in the TCP header Read the field through an API like ReadInt32 or ReadInt16. Store the field into local temporary storage. | Cast the appropriate section of the immutable buffer to a TCP header object. |
| When all fields are read, create a TCP header object in the managed heap. This once again involves explicitly copying each field in the TCP header, this time from local storage into heap storage. Access the TCP header object to perform whatever action is necessary. | Access the TCP header object to perform whatever action is necessary. |

Obtaining a usable TCP header object is considerably faster with type casting then it is with the traditional approach. The new approach mimics what happens in a native operating system, where pointer math is possible and is taken advantage of frequently in this kind of scenario. Pointer math is not available in managed programming languages, but type-safe type casting delivers the same functionality.

Variations are possible on the traditional approach, which lead to more or less overhead. For example, it is possible that the memory buffer in question is directly available to the programmer and so can be accessed more efficiently than by using Read/Write methods. However, in that case the programmer is still responsible for turning a sequence of bytes into a higher-level object which is tedious, error-prone, and performs poorly.

What makes type casting possible and ensures that type safety is preserved is that type casting is only possible with types that are designed to allow it. In order to participate in type casting, types: 1) are value types (as opposed to reference types), 2) are composed only of other types which support type casting, 3) are not be composed of references, 4) are defined using specific memory layout, and 5) tolerate any bit pattern in any of its fields.

These restrictions mean that in order to be used for type casting, a type cannot contain references to other objects. It turns out that these restrictions perfectly describe the characteristics of types defined to represent data formats like TCP headers and a vast set of other such data structures.

As described, type-safe type casting can be used to read or write to I/O buffers which are located outside of the reach of the managed memory environment, and can also be used to view managed memory as a different type. In particular, this technique is useful to view arrays of bytes as instances of one or more richer types instead.

Figure 13:
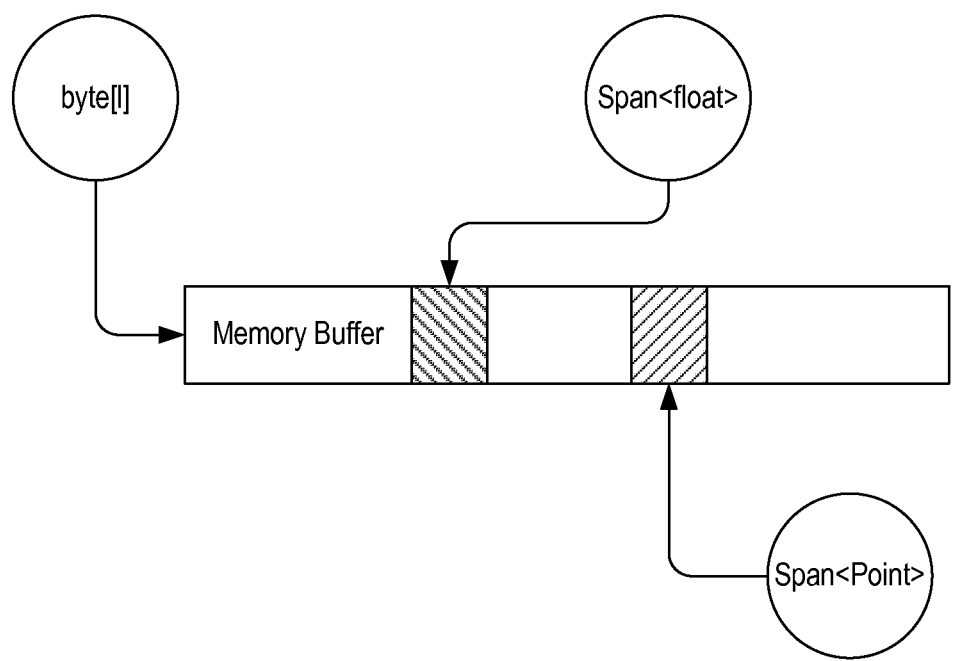
FIG. 13 depicts a normal managed array of bytes which has two distinct spans pointing into it and allowing the application to view portions of the array as different types.

FIG. 13 depicts a normal managed array of bytes which has two distinct spans pointing into it and allowing the application to view portions of the array as different types. Any number of spans can be created in this way, each with distinct types. The spans can freely overlap, referencing potentially the same region of memory as different types.

The rule that says any bit pattern must be tolerable in any of its fields is important to the reliability of the model. When using type casting, instances of otherwise normal-looking objects are introduced into the environment without having had the type constructor executed. Normally, a constructor performs validation of input arguments and serves to ultimately constrain the set of allowed values that make up an object. But with type casting, it is possible to create an object out of thin air by viewing an existing span of memory as it if were a different type.

The traditional approach of copying data into a distinct object in the managed heap provides an opportunity to validate the data as it is pushed into the constructor of the managed object. This means that in a real-world system, invalid versions of the managed object never exist within the system, the constructor ensures that only valid versions can be created. Contrast this with type casting where any bit pattern may appear. If there are values which are semantically invalid, they cannot be detected since object construction doesn't take place.

The solution to the correctness issue is to introduce an additional abstraction layer in the software. In particular, if we take the example of reading a TCP header again, you can imagine that the developer has defined two distinct types: RawTcpHeader and ValidTcpHeader.

The data in the input buffer would be type cast to a RawTcpHeader. Given that object, then a AcquireValidTcpHeader method can be invoked. This method would validate the fields in the RawTcpHeader and would return a new instance of ValidTcpHeader which would act as a trivial wrapper around a RawTcpHeader and would tell the holder that he's got a guaranteed-valid header in hand. This is all done without a copy, merely the creation of a pass-through object which is the ValidTcpHeader value type.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for sharing data between multiple computing entities, the method performed by executing computer-executable instructions upon one or more computer processors, the method comprising:
   executing computer-executable instructions upon one or more computer processors for performing:
      an act of populating a buffer with data;
      an act of classifying the buffer as an immutable buffer, wherein the classification protects the data populated within the immutable buffer from changing during the lifetime of the immutable buffer, and also protects the immutable buffer from having its physical address changed during the lifetime of the immutable buffer;
      an act of granting a first view of the immutable buffer to a first computing entity; and
      an act of granting a second view of the immutable buffer to a second computing entity, wherein the second view is different than the first view.

2. The method in accordance with claim 1, wherein the second view is a subset of the first view.

3. The method in accordance with claim 1, further comprising:
   an act of calculating the second view based on information provided by the first computing entity as a result of processing a first view of the immutable buffer.

4. The method in accordance with claim 1, wherein the first computing entity is a first process, and the second computing entity is a second process.

5. The method in accordance with claim 1, wherein the first and second computing entities are on a different side of a protection boundary.

6. The method in accordance with claim 5, wherein the first computing entity is a kernel entity, and the second computing entity is an application component.

7. The method in accordance with claim 1, wherein the first and second computing entities are first and second managed code components in a managed system.

8. The method in accordance with claim 7,
wherein the first managed code component has exclusive access to a first entity memory and the second managed code component has exclusive access to a second entity memory, and
wherein the immutable buffer is outside of the first and second entity memory.

9. The method in accordance with claim 8, wherein the first entity memory has a first non-garbage collected reference to the first view of the immutable memory.

10. The method in accordance with claim 7, wherein the data is generated outside of the type system of the managed system.

11. The method in accordance with claim 10, further comprising:
an act of associating a type with associated data being at least a portion of the data in the immutable buffer without actually constructing an object of that type using the associated data.

12. The method in accordance with claim 11, wherein the type does not have invalid byte values.

13. The method in accordance with claim 1, wherein function call cannot be placed between the first computing entity and the second computing entity, but rather an inter-process communication or a cross protection boundary communication is used for the first computing entity and the second computing entity to communicate.

14. The method in accordance with claim 13, wherein the first computing entity maintains a cache of the immutable buffer and has a strong reference to the immutable buffer, wherein so long as any entity has a strong reference, the immutable buffer is guaranteed to continue to exist for at least the duration of the strong reference for each entity that has the strong reference.

15. The method in accordance with claim 14,
wherein the second computing entity communicates with the first computing entity to obtain a strong reference to the immutable buffer and thereafter read data from the immutable buffer,
wherein upon or after reading the data from the cache, the second computing entity demotes the strong reference to the immutable buffer to a weak reference to the immutable buffer, wherein a weak reference to the immutable buffer does not guarantee that the immutable buffer will continue to exist for the duration of the weak reference,
whereupon upon receiving a request to read from the immutable buffer while the weak reference to the cache still exists, the second computing entity determines whether the immutable buffer still exists, and
if the immutable buffer still exists, converts the weak reference to the immutable buffer to a strong reference to the immutable buffer and reads the data without performing an inter-process or cross protection boundary communication with the first computing entity; and
if the immutable buffer does not still exists, performs an inter-process or cross protection boundary communication with the first computing entity to thereby cause the first computing entity to re-create the immutable buffer and allowing the second computing entity to gain a strong reference to the immutable buffer and read from the immutable buffer.

16. The method in accordance with claim 1, wherein the first and second computing entities are unmanaged code components.

17. The method in accordance with claim 1, wherein the buffer is a first buffer, and the immutable buffer is a first immutable buffer, the method further comprising:
an act of populating a second buffer with data;
an act of classifying the second buffer as an immutable buffer, wherein the classification of the second buffer as being immutable protects the data populated within the second immutable buffer from changing during the lifetime of the second immutable buffer, and also protects the second immutable buffer from having its physical address changed during the lifetime of the second immutable buffer;
an act of granting a first view of the second immutable buffer to a third computing entity; and
an act of granting a second view of the immutable buffer to a fourth computing entity, wherein the second view of the second immutable buffer is different than the first view of the second immutable buffer.

18. The method in accordance with claim 17, wherein the first immutable buffer and the second immutable buffer are portions of a data stream, and the first computing entity and the third computing entity are a same computing entity and a streaming component that manages the data stream.

19. A computer program product comprising one or more computer storage devices having stored thereon computer-executable instructions that, when executed by one or more processors of a computing system, cause the computing system to perform a method for sharing data between multiple computing entities, the method comprising:
an act of populating a buffer with data;
an act of classifying the buffer as an immutable buffer, wherein the classification protects the data populated within the immutable buffer from changing during the lifetime of the immutable buffer, and also protects the immutable buffer from having its physical address changed during the lifetime of the immutable buffer;
an act of granting a first view of the immutable buffer to a first computing entity; and
an act of granting a second view of the immutable buffer to a second computing entity, wherein the second view is different than the first view.

20. A system comprising:
one or more computer processors;
system memory;
a computer memory having a buffer;
a populating computing entity that acquires data or generates data, and populates the data into the buffer, after which the buffer is classified as immutable, wherein the classification protects the data populated within the immutable buffer from changing during the lifetime of the immutable buffer, and also protects the immutable buffer from having its physical address changed during the lifetime of the immutable buffer;
a plurality of consuming computing entities that consume data from the immutable buffer; and
a view providing entity that provides different views on the immutable buffer to at least some of the plurality of consuming computing entities.

* * * * *